US007895477B2

(12) United States Patent
Gollub et al.

(10) Patent No.: US 7,895,477 B2
(45) Date of Patent: Feb. 22, 2011

(54) RESILIENCE TO MEMORY ERRORS WITH FIRMWARE ASSISTANCE

(75) Inventors: Marc A. Gollub, Round Rock, TX (US); Zane C. Shelley, Rochester, MN (US); Alwood P. Williams, III, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 12/132,135

(22) Filed: Jun. 3, 2008

(65) Prior Publication Data

US 2009/0300425 A1    Dec. 3, 2009

(51) Int. Cl.
*G06F 11/00*    (2006.01)
(52) U.S. Cl. .............................. 714/53; 714/5; 711/206
(58) Field of Classification Search ..................... 714/53
See application file for complete search history.

(56) References Cited

U.S. PATENT DOCUMENTS

| | | | |
|---|---|---|---|
| 6,418,068 B1 | 7/2002 | Raynham | |
| 6,845,469 B2 | 1/2005 | Hicks et al. | |
| 7,478,268 B2 * | 1/2009 | Henderson et al. | 714/5 |
| 7,496,823 B2 * | 2/2009 | Wheeler et al. | 714/764 |
| 2003/0212873 A1 * | 11/2003 | Lee et al. | 711/170 |
| 2006/0212778 A1 * | 9/2006 | Wheeler et al. | 714/764 |
| 2007/0061612 A1 * | 3/2007 | Henderson et al. | 714/5 |

OTHER PUBLICATIONS

U.S. Patent Application entitled "Memory Metadata Used to Handle Memory Errors Without Process Termination" by Marc A. Gollub et al., filed Jun. 3, 2008.
U.S. Patent Application entitled "Clearing Interrupts Raised While Performing Operating System Critical Tasks" by Marc A. Gollub et al., filed Jun. 3, 2008.

* cited by examiner

*Primary Examiner*—Christopher S McCarthy
(74) *Attorney, Agent, or Firm*—Patterson & Sheridan, LLP

(57) ABSTRACT

Embodiments of the invention provide an interrupt handler configured to distinguish between critical and non-critical unrecoverable memory errors, yielding different actions for each. Doing so may allow a system to recover from certain memory errors without having to terminate a running process. In addition, when an operating system critical task experiences an unrecoverable error, such a task may be acting on behalf of a non-critical process (e.g., when swapping out a virtual memory page). When this occurs, an interrupt handler may respond to a memory error with the same response that would result had the process itself performed the memory operation. Further, firmware may be configured to perform diagnostics to identify potential memory errors and alert the operating system before a memory region state change occurs, such that the memory error would become critical.

25 Claims, 6 Drawing Sheets

| MEMORY PAGE (202₁) | WRITE FLAG (204₁) | READ-ONLY FLAG (206₁) | BACK-UP FLAG (208₁) | ZEROED FLAG (310) |
|---|---|---|---|---|
| 1 | N | N | N/A | Y |
| 2 | N | Y | Y | N |
| 3 | N | Y | N | N |
| 4 | Y | Y | N/A | N |

FIG. 2A

| PROCESS ID (212) | TASK TYPE (214) | REQUESTING O/S (216) |
|---|---|---|
| 1 | I/O | OSA |
| 2 | VMM | N/A |
| 3 | I/O | OSB |
| 4 | SCHED | OSC |

RESILIENCE TO MEMORY ERRORS WITH FIRMWARE ASSISTANCE

BACKGROUND OF THE INVENTION

The present invention generally relates to recovering from memory errors, and more specifically, to improving operating system resilience to memory errors with optional firmware assistance.

DESCRIPTION OF THE RELATED ART

As is known, a CPU may include an interrupt request line that the CPU senses after executing each instruction. If a controller (e.g., a memory controller) has asserted a signal on the interrupt request line (i.e., has raised an interrupt), the CPU saves a small amount of state information and jumps to an interrupt handler at a fixed address in memory. The interrupt-handler determines the cause of the interrupt and performs the necessary processing.

When a computer executes instructions, a variety of conditions may lead to an interrupt. In addition to handling I/O requests from peripheral and storage devices, interrupts may be raised to handle a variety of events. For example, if a process tries to read (or write) to a memory address that is not allocated to the process, the result is an unrecoverable memory error (often referred to as an exception or machine check interrupt). An interrupt is also raised when a process encounters other unrecoverable memory errors, e.g., when a memory cell becomes corrupted or experiences a physical failure. When such an interrupt occurs, the processor saves state information for the interrupt handler to use, e.g., the process or task being executed, the immediately preceding instruction executed, the memory address attempted to be accessed, general purpose register values, etc.

With the large capacity of memory used in high-end servers, it is likely for such systems to experience a memory cell failure at some point during their lifetime. Similarly, given the large number of processors and memory cells present in distributed systems, parallel computing clusters, and data centers, unrecoverable memory errors are simply expected to occur on a regular basis. When a computer system experiences these types of memory errors, a typical response is to raise a machine check interrupt to the operating system or hypervisor. In partitioned systems, the hypervisor might create a virtual machine check interrupt to the operating system in the partition owning the failed memory. The interrupt handler is configured to terminate the process that executed the memory access instruction or the entire OS if a critical service, such as the kernel, was executing the instruction.

SUMMARY OF THE INVENTION

One embodiment of the invention includes a method for improving operating system resilience to memory errors using firmware assistance. The method may generally include detecting a memory failure in a memory address allocated to an active process, prior to the occurrence of a machine check interrupt resulting from the execution of an instruction of the active process, sending an indication of the detected memory failure in the memory address to an instance of an operating system in which the active process is executing, and determining, by the operating system, a memory region that includes the memory address. Upon determining that the memory address is in an ejectable memory region, a discard procedure is performed for the memory region.

Another embodiment of the invention includes a computer readable storage medium containing a program configured to improve operating system resilience to memory errors using firmware assistance. The operation may generally include detecting a memory failure in a memory address allocated to an active process, prior to the occurrence of a machine check interrupt resulting from the execution of an instruction of the active process, sending an indication of the detected memory failure in the memory address to an instance of an operating system in which the active process is executing, and determining, by the operating system, a memory region that includes the memory address. Upon determining that the memory address is in an ejectable memory region, a discard procedure for the memory region is performed.

Still another embodiment of the invention includes a system having a processor and a memory storing a program configured to improve operating system resilience to memory errors using firmware assistance. The program may generally be configured to perform the steps of detecting a memory failure in a memory address allocated to an active process, prior to the occurrence of a machine check interrupt resulting from the execution of an instruction of the active process, sending an indication of the detected memory failure in the memory address to an instance of an operating system in which the active process is executing, determining, by the operating system, a memory region that includes the memory address. Upon determining that the memory address is in an ejectable memory region, a discard procedure for the memory region is performed.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2A-2B illustrates an example of memory metadata, according to one embodiment of the invention.

DETAILED DESCRIPTION OF THE PREFERRED EMBODIMENTS

Figure 1A:
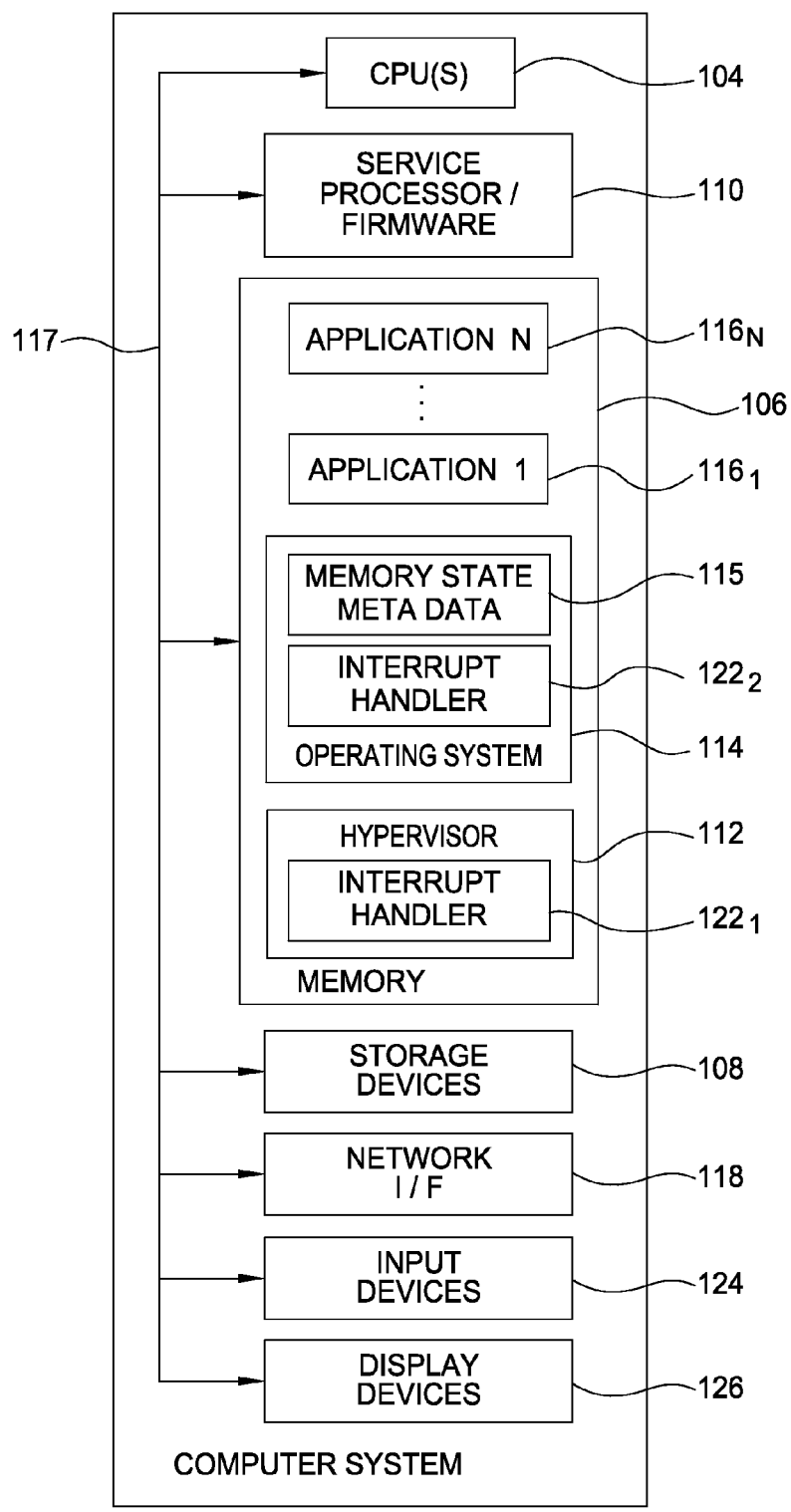
FIG. 1A is a block diagram illustrating an example of a computing system, according to one embodiment of the invention.

Embodiments of the invention provide an interrupt handler configured to distinguish between critical and non-critical unrecoverable memory errors, yielding different actions for each. Doing so may allow a system to recover from certain memory errors without having to terminate a running process. In addition, when an operating system critical task experiences an unrecoverable error, such a task may be acting on behalf of a non-critical process (e.g., when swapping out a virtual memory page). When this occurs, an interrupt handler may respond to a memory error with the same response that would result had the process itself performed the memory operation. Further, firmware may be configured to perform diagnostics to identify potential memory errors and alert the operating system before a memory region state change occurs, such that the memory error would become critical.

To manage memory assignment and sharing between operating system processes and to facilitate features such as virtual memory swapping, operating systems typically maintain meta-data related to memory regions such as page tables, inverse memory maps, virtual memory area (VMA) tables, free page lists, etc. In one embodiment, if a memory error occurs when a process attempts to access a given memory address (raising a machine check interrupt), an interrupt handler may be configured to evaluate this meta-data to identify whether the page that includes the given memory address is an "ejectable" state. A page is "ejectable" if the operating system can discard it without any ill effects. For instance, among other examples, a page containing only executable application code might be reloaded from a copy on a hard drive, or a page might have a mirrored copy in a virtual memory swap location, or a page might contain a cached copy of a network attached file system. In any of these cases, the interrupt handler may be configured to clear the interrupt by ejecting the page and returning control to the instruction that caused the machine check interrupt. Typically, ejecting a memory page is a simple operation that includes clearing the region from all page tables. In the event the error occurs again, (e.g., where a process tries to write to a memory address that is not allocated to the process), then the interrupt handler may terminate the process. However, if the memory error occurred due to a physical memory failure, the ejected page may be reloaded into a different physical address region and processing can continue.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1A is a block diagram illustrating an example of a computing system 100, according to one embodiment of the invention. As shown, the computing system 100 includes one or more central processing units (CPUs) 104, a service processor 110, a memory 106, and a storage device 108, coupled to one another by a bus 117. Computing system 100 is also shown to include a network interface 118 allowing the system 100 to connect to a data communications network, input devices 124 such as a keyboard and mouse pointing device, and a display deceive 126 such as a CRT or LCD display monitor. Memory 106 may be a random access memory sufficiently large to hold the necessary programming and data structures of the invention. Storage devices 108 is included to be representative of physical disk drives, flash memory devices, etc., as well as network attached storage devices and storage volumes mounted over a network.

Service processor 110 provides a processor separate from the CPU(s) 104. Service processor 110 may be an embedded processor chip or present a separate PCI card and provide functions such as basic monitoring and control of system 100. Service processor 110 is not typically involved in day-to-day production tasks of running applications or manipulating data. Instead, service processor 110 may allow a system administrator to monitor and troubleshoot system 100 by providing access to hardware monitoring and alerts. In one embodiment, service processor 110 may include firmware (or other elements) configured to evaluate the state of memory 106 in order to detect failures in any given memory cell. For example, service processor 110 and/or firmware on system 100 may be configured to perform continuous or periodic memory diagnostics. Such firmware may be configured to detect an unrecoverable memory error before a faulting memory cell is accessed by an operating system or computing task.

The applications $116_{1-N}$ running on computer system 100 are generally managed by operating system 114 shown residing in memory 106. Examples of operating system 114 include IBM AIX®, UNIX®, Microsoft Windows®, and distributions of the Linux® operating system, and the like. More generally, any operating system capable of supporting the functions described herein may be used. In one embodiment, operating system 114 may be configured to store metadata 115 indicating what memory regions are allocated to a given application $116_{1-N}$ of memory, whether a memory region has a copy of its data in storage 108 (e.g., when a memory region includes application code paged in from disk).

Figure 1B:
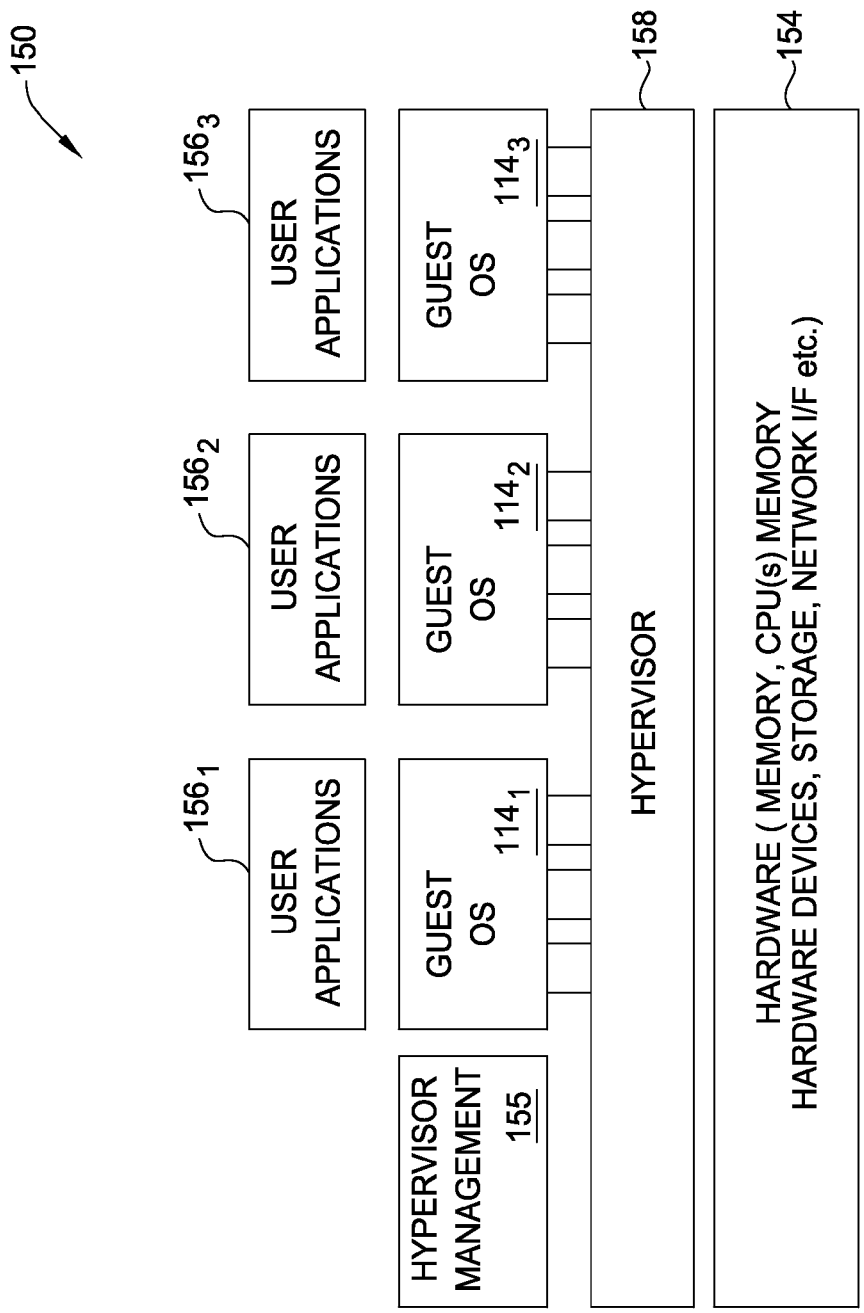
FIG. 1B is a block diagram illustrating an example configuration of a partitioned system, according to one embodiment of the invention.

In one embodiment, operating system 114 may be running as a guest operating system managed by a hypervisor 112. As is known, a hypervisor (sometimes referred to as a virtual machine monitor (VMM)) generally allows multiple operating systems 114 to run on a host computer at the same time. The hypervisor 112 may provide a software layer that runs directly on the hardware intercepting some (or all) operating systems calls to hardware. Typically, the hypervisor 112 provides each guest operating system with a virtual CPU and memory, and a single privileged guest operating system manages and virtualizes network and disk operations. An Input-Output (I/O) operation is an example of a task that hypervisor 158 may perform on behalf of a guest operating system. For example, FIG. 1B illustrates an example configuration of a partitioned system 150, according to one embodiment of the invention. As shown, a hypervisor 158 provides a software layer that exposes underlying hardware 154 (e.g., memory, CPU, Network interfaces, input/output interfaces, etc, physically present on a computer system 150) to one or more guest operating systems $156_{1-3}$. Thus, the hypervisor 158 allows multiple guest operating system images $114_{1-3}$ (and corresponding user applications $156_{1-3}$) to share the resources of a single server, and each operating system 114 performs as though it had the resources of the entire machine under its control.

Illustratively, partitioned system 150 includes three guest operating systems $114_{1-3}$ each running a set of user applications 156 as well as a hypervisor management partition 155. Like guest operating systems $114_{1-3}$, the hypervisor management partition 155 provides an operating system executing in a virtualized partition provided by hypervisor 158. However, unlike guest operating systems $156_{1-3}$, management partition 155 may have special privileges, such being able to create new guest operating systems and being able to access the hardware 154 directly.

Referring again to FIG. 1A, the operating system 114 includes an interrupt handler $122_2$. The interrupt handler $122_2$ provides a function to clear machine check interrupts in the event of a memory error encountered during execution of applications $116_{1-N}$ or operating system 114. In one embodiment, the interrupt handler $122_2$ may use metadata 115 to differentiate between critical and non-critical memory errors, and handle the errors accordingly. Examples of metadata 115 include page tables, inverse memory maps, VMA tables, free page lists, etc. Operating system 114 typically stores metadata 115 such as this about what memory regions are allocated to what application 116 (and what memory regions are allocated to the operating system 114). This metadata might include information such as which application 116 is currently allocated a given memory region, whether such a memory region has a copy in a virtual memory swap disc, or information about what is stored in a given memory region (e.g., application code or data), etc. In some embodiments, memory region metadata 118 may include information that specifies whether a given memory region is ejectable.

In the event of critical memory errors, the interrupt handler $122_2$ may terminate the application 116 that raised the interrupt. In the event of non-critical errors, the interrupt handler $122_2$ may restore the memory region with the error, and return control to the application 116. In partitioned systems, the hypervisor 112 may receive an interrupt resulting from a memory cell failure resulting from an operation being performed by one of the guest operating systems (or an application running thereon). In such a case, the hypervisor 112 might raise a virtual machine check interrupt to interrupt handler $122_1$. In response, the interrupt hander $122_1$ may pass the interrupt handler $122_2$ in the appropriate the guest operating system.

In one embodiment, a memory error is critical if the associated memory region is not ejectable. A region is ejectable if the operating system 114 can discard the region without any ill effects such as data loss, e.g., a page containing only executable application code might be reloaded from a copy on a hard drive, or a page might have a mirrored copy in a virtual memory swap location, or a page might contain a cached copy of a network attached file system, among other examples. In any of these cases, the interrupt handler $122_2$ may be configured to clear the interrupt by ejecting the page and returning control to the instruction that caused the machine check interrupt. Typically, ejecting a memory page is a simple operation that includes clearing the region from all page tables. In the event the error occurs again, (e.g., where an application 116 tries to write to a memory address that is not allocated to that application 116), then the interrupt handler $122_2$ may terminate that application $122_2$. However, if the memory error occurred due to a physical memory failure, the ejected page may be reloaded into a different physical address region and processing can continue.

Further, in some cases, the operating system 114 may perform an action that raises a machine check interrupt cleared by interrupt handler $122_2$. For example, while executing components of the operating system 114, a memory error may occur. However, operating system 114 often performs actions on behalf of one of the applications 116 (e.g., when the application 116 invokes a system call). In the event of a critical error, instead of terminating the operating system 114, the interrupt handler $122_2$ may simply terminate the process 116 on whose behalf the operating system 114 is performing the task. However, in some cases, the operating system 114 may encounter a memory error in the midst of performing a critical task, such as a scheduling task. In such a case, the interrupt handler $122_2$ may terminate the operating system itself. Further still, as stated above, firmware installed on the server (e.g., as part of service processor) may perform continuous or periodic memory diagnostics to identify potential memory errors and alert the operating system before a memory region state change occurs such that the memory error would become critical. In such a case, the operating system 114 may restore memory regions before an access to the memory region triggered the interrupt handler $122_2$.

FIG. 2A is an example of memory metadata 115, according to one embodiment of the invention. As shown, metadata 115 is represented as a table which includes a memory region column 202, a write flag column 204, a read-only flag column 206, a back-up flag column 208, and a zeroed flag column 210.

The memory region column 202 contains an identifier for the memory region being described in a particular row of the table 118. The write flag column 204 specifies whether any data has been written to the memory region. If the write-flag column contains a "Y" value, data has been written to the memory region. Accordingly, the memory region may not be ejectable.

The read-only flag column 206 specifies whether the data stored in a given memory region is read-only. If the read-only flag column 206 contains a "Y" value, then the memory region cannot be written to. Accordingly, the memory region may be ejectable if a copy of the data stored in the memory region is stored on another device (e.g., application code paged in from disk).

The back-up flag column 208 specifies whether a copy of the data stored in the memory region backed-up, i.e. stored on a secondary storage, such as a virtual memory swap disk. A memory region may be ejectable if the back-up flag column 208 contains a "Y" value.

The zeroed flag column 310 specifies whether the memory region has been zeroed out without further storage. Typically, upon allocation, the operating system initiates the memory region by storing zero values in the entirety of the region. Once the region is written to, or has data otherwise stored within, the zeroed flag contains an "N" value. If a memory region contains only zero values, in some embodiments, the region is ejectable because no data loss results from a memory error in the region. Another region can be allocated without ill effect on the process accessing the memory region.

Illustratively, the first row of the table 118 identifies a memory region "1" in the region column 202. The write flag column 204 for memory region "1" contains an "N" value. Accordingly, memory region "1" has not been written to. The read-only flag column 206 also contains an "N" value, indicating that memory region 1 may be written to, i.e., is memory region "1" is not marked read-only. The back-up flag column 208 contains an "N" value, indicating that there is no copy of the data within memory region 1 stored on a secondary storage device. Lastly, the zeroed flag column 210 contains a "Y" value, indicating that memory region "1" contains only zero values and is, therefore, ejectable. The other rows within table 118 contain similar values for memory regions for pages "2," "3," and "4."

FIG. 2B is an example of a process mapping table 200, according to one embodiment of the invention. Process mapping table 200 includes a process id column 212, critical task flag column 214, and requesting entity column 216. In one embodiment, the interrupt handlers $122_{1,2}$ may evaluate date from the process mapping table 200 to determine on which application a given operating system function is performed, and whether those processes are critical.

Illustratively, the process id column 212 identifies an active process described in columns 214-216. The process identified in column 212 may be a hypervisor or an operating system process. The critical task flag column 214 specifies whether the process is performing a critical task. The critical task flag column 214 may contain either a "Y" or "N" value. For processes performed by the hypervisor 112, the requesting entity column 216 indicates which partition the hypervisor is performing a given function. For functions performed by the operating system 114, the requesting entity column 216 identifies on which process's behalf the operating system 114 is performing the process.

The first row of the process mapping table 200 includes a value of "1" for in the process id column 212. In some embodiments, the process id may include identifiers which specify whether the process is an operating system or a hypervisor process. The critical task flag column 214 contains a "Y" value, indicating that process 1 is a critical task. The requesting entity column 216 contains the value "OSA," indicating that process 1 is being run on behalf of the partition with operating system A. Because process 1 is a critical task, In the event of a memory error, the hypervisor interrupt handler $122_1$ may terminate operating system A.

Figure 3:
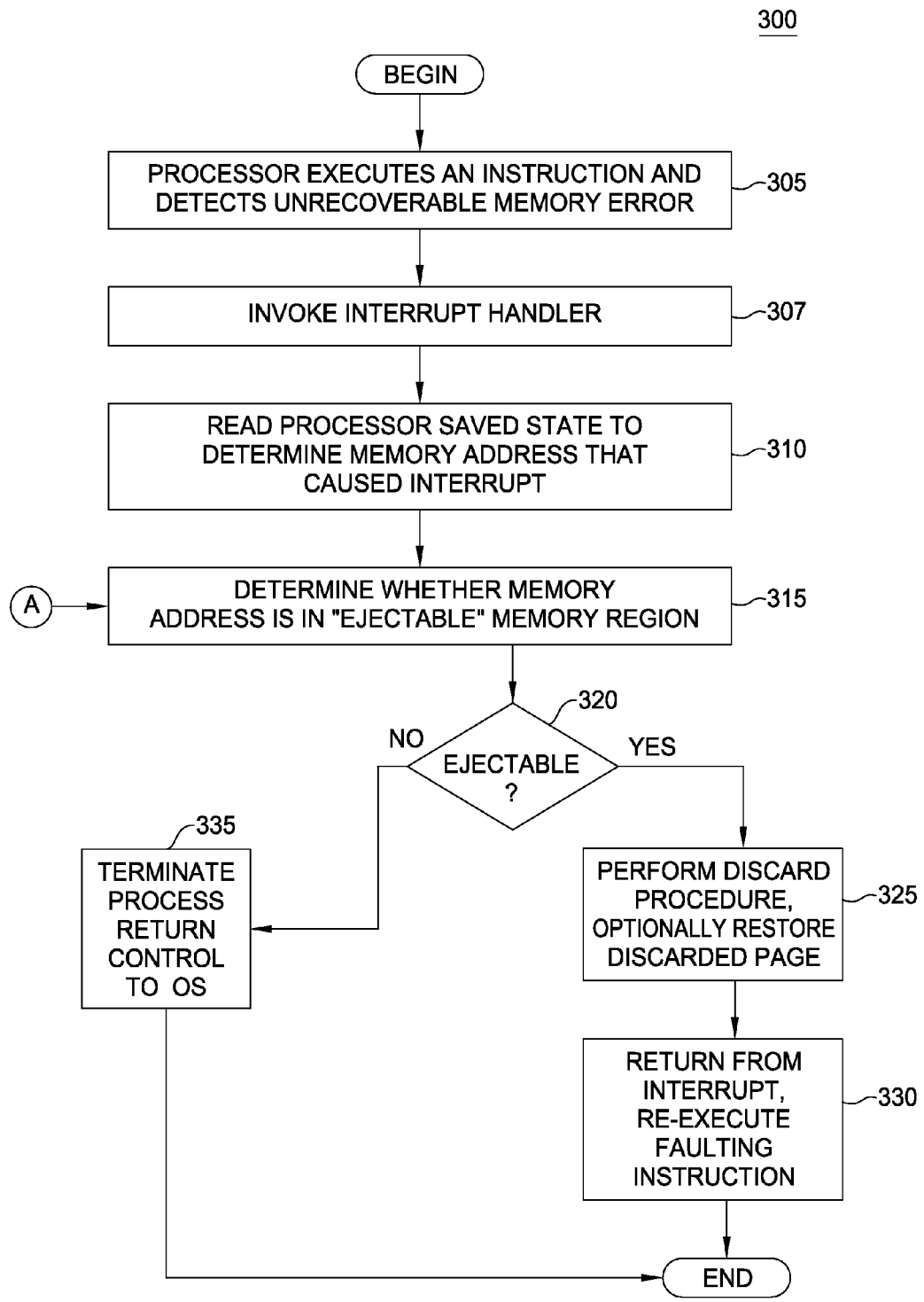
FIG. 3 illustrates a method for using memory metadata to attempt to handle a memory error without terminating a process, according to one embodiment of the invention.

FIG. 3 illustrates a method 300 for using memory metadata to attempt to handle a memory error without terminating a process, according to one embodiment of the invention. As described above, a conventional interrupt handler may clear an unrecoverable memory error by determining what process was being executed when the error occurred, terminate that process, and choose a waiting process to execute.

Method 300 illustrates an embodiment of the invention where an interrupt handler is configured to use memory metadata to attempt to clear the memory error without terminating the process that was running when the error occurred. As shown, the method 300 begins at step 305 where a processor running a user application (or operating system task) executes an instruction that results in a machine check interrupt being raised. And in response, the CPU detects that the machine check interrupt has been raised At step 307, the CPU may transfer control to an interrupt handler specified to clear the interrupt detected at step 305. At step 310, the interrupt handler may read state information saved by the CPU to identify the memory address that caused the interrupt to occur. At step 315, the interrupt handler may be configured to evaluate memory metadata to determine whether the memory address (or page or other memory region that includes the address) is in an ejectable state. As stated, region may be considered ejectable if the region may be discarded and reloaded from another location, e.g., a page containing only executable application code might be reloaded from a copy on a hard drive, or a page might have a mirrored copy in a virtual memory swap location, or a page might contain a cached copy of a network attached file system, among other examples. At step 320, if the memory region is ejectable, then at step 325, the interrupt handler may perform (or cause to be performed) a discard procedure for that memory region. For example, the interrupt handler may flush a cached page that includes the faulting address from a page table, leading to that page being read back into memory when the address is subsequently attempted to be read.

Additionally, in one embodiment, the interrupt handler could also remove the region from further use through a variety of means, such as dynamic removal in a dynamic logically partitioned system. Further, the interrupt handler could also be configured to differentiate between system memory errors (e.g., when a process reads/writes from memory not allocated to that process) and memory cell memory errors (e.g., when a memory cell has simply failed) to determine whether an address should be removed from any further allocation.

At step 330, the interrupt handler may return control back to the instruction that originally resulted in the interrupt being raised. As part of step 330, the interrupt handler could be configured to restore the ejected memory page before resuming execution. Typically however, the restoration need not occur as the processor will cause a "non-allocated memory access" interrupt immediately after resuming execution, resulting in the page being restored through normal means.

Otherwise, if at step 320, the memory region is not ejectable, then at step 335, the interrupt handler may determine what process was being executed when the error occurred, terminate that process, and choose a waiting process to execute. That is, if the memory region is not ejectable, the interrupt handler may be configured to fall back on conventional techniques for clearing a machine check interrupt.

Figure 4:
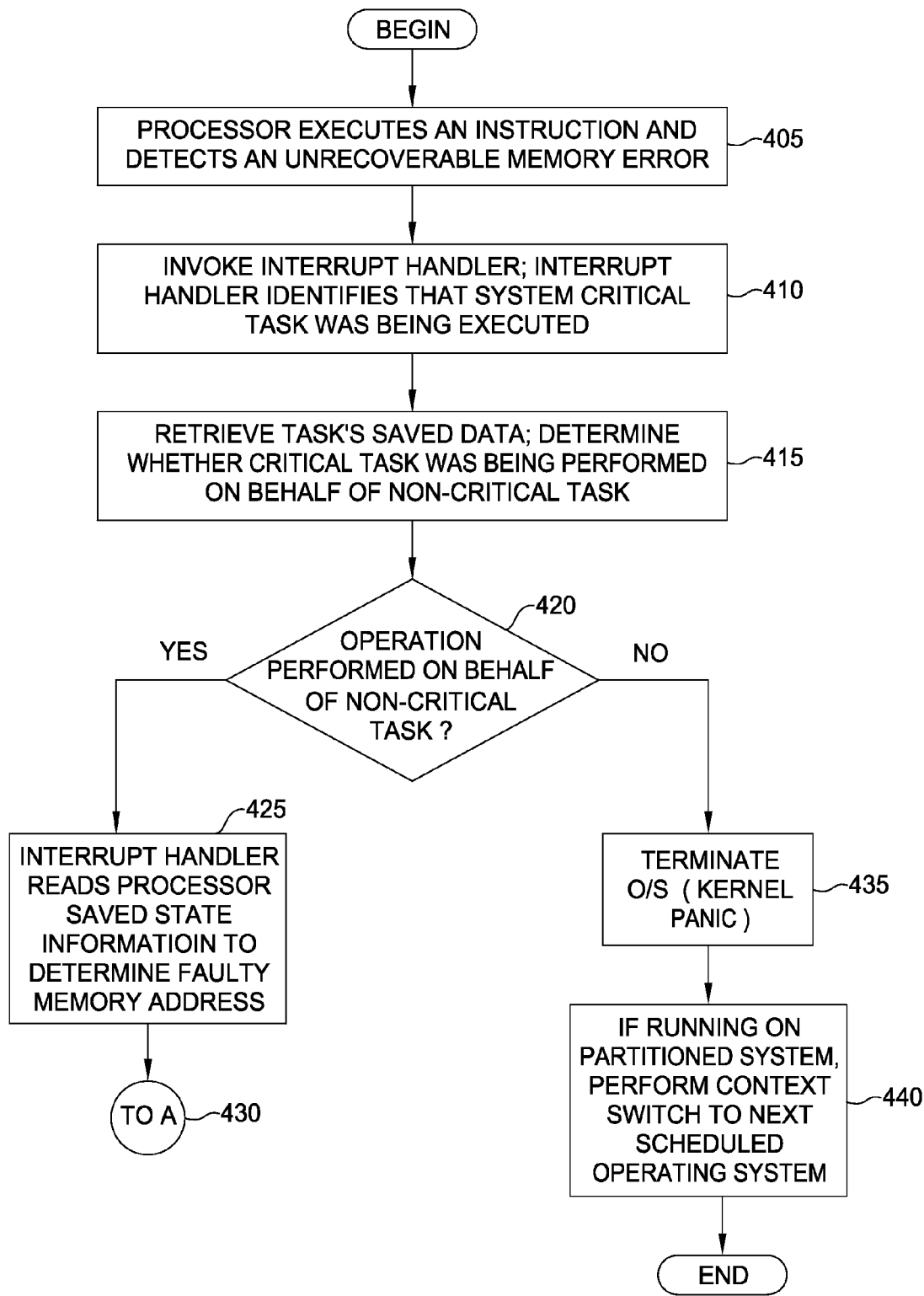
FIG. 4 illustrates a method for an interrupt handler to utilize information about a task being performed to reduce the severity of an unrecoverable memory error, according to one embodiment of the invention.

FIG. 4 illustrates a method 400 for an interrupt handler to utilize information about a task being performed to reduce the severity of an unrecoverable memory error, according to one embodiment of the invention.

Method 400 illustrates an embodiment of the invention where an interrupt handler is configured to evaluate whether an operating system critical task is performed on behalf of the operating system itself or on behalf of a user level application. Operating system critical tasks are frequently executed on behalf of a non-critical process. For instance, a dynamic memory region de-allocation request in a dynamically logically partitioned system results in the operating system critical task code to execute a memory copy of memory owned by a non-critical process. In one embodiment, when an unrecoverable memory error occurs as part of performing such a request, if the process being executed was an operating system critical task, the interrupt handler is executed as in the non-critical case, the interrupt may be configured to use information about a task being performed to, at least in some cases, reduce the severity of the unrecoverable memory error.

As shown, the method 400 begins at step 405, where a processor executes an instruction that results in a machine check interrupt being raised while the operating system was executing a system critical task. For example, the instruction being executed was part of the operating system's kernel. In response, the processor detects that the machine check interrupt has been raised, and at step 410, invokes the operating system interrupt handler. Additionally, the Interrupt handler reads processor saved state information to determine that a system critical task was being executed when the interrupt was raised. At step 415, the interrupt handler uses the state information saved by the processor before invoking the interrupt handler to determine whether the operating system critical task was being executed on behalf of a non-critical task, e.g., the operating system function was being executed in response to a system call invoked by a user application.

At step 420, if the operation was being performed on behalf of a non-critical task, then at step 425, the interrupt handler may read state information saved by the processor to determine memory address being accessed that resulted in the interrupt. And at step 430, the interrupt handler may be configured to perform steps of the method 300, beginning at step 315 labeled "A" to eject an ejectable page with a faulting memory address or terminate a running process. Otherwise, if at step 420, the operation that resulted in the interrupt detected at step 405 was performed by the operating system on behalf of a critical task, then at step 435 the interrupt handler may terminate the running operating system and the user may be presented with a kernel panic message. Additionally, at step 440, if the interrupt handler is running on a partitioned system, the hypervisor may perfume a context switch to run the next scheduled guest operating system.

Figure 5:
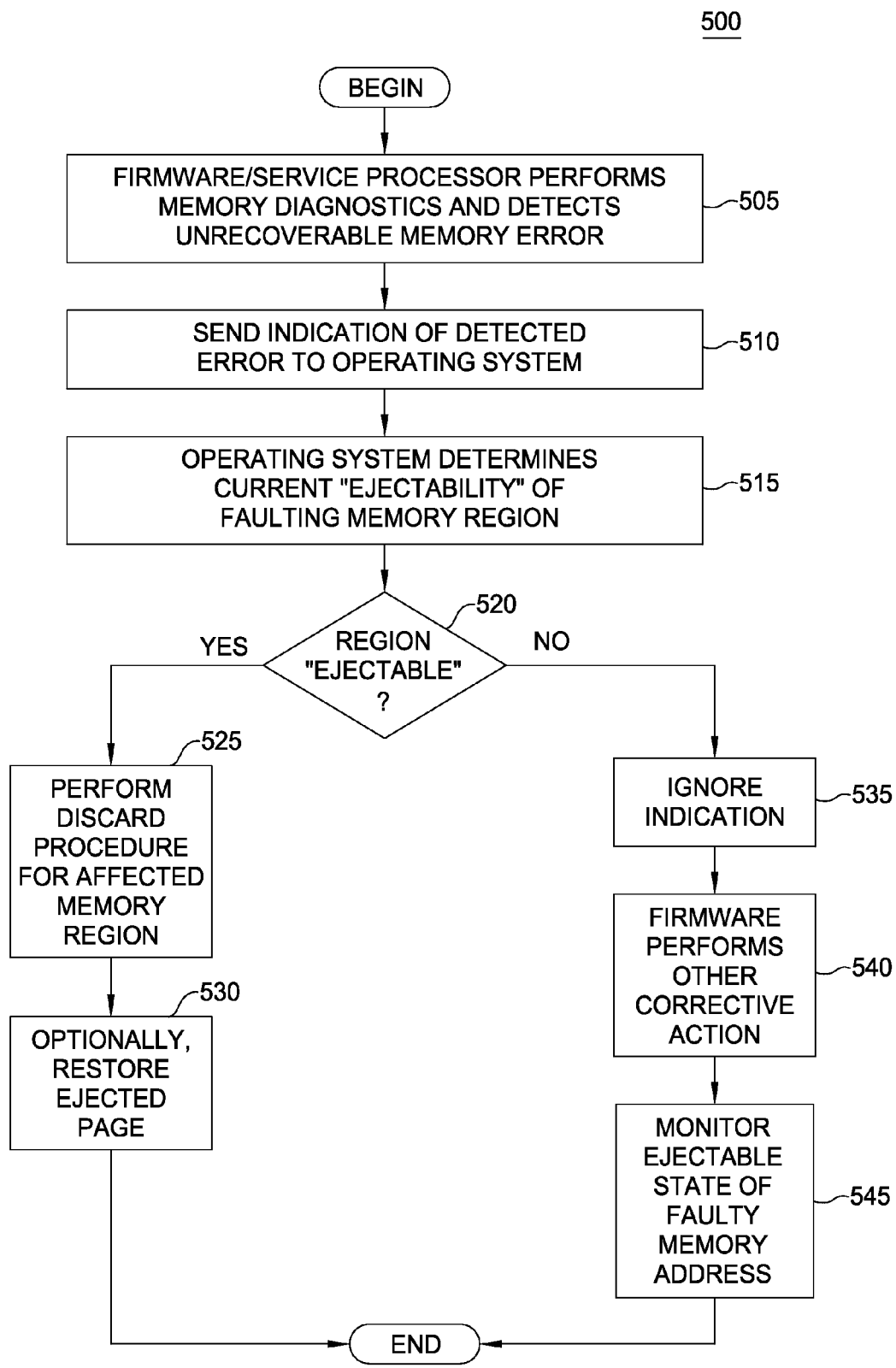
FIG. 5 illustrates a method for improving operating system resilience to memory errors with optional firmware assistance, according to one embodiment of the invention.

FIG. 5 illustrates a method 500 for improving operating system resilience to memory errors with optional firmware assistance, according to one embodiment of the invention.

As described above, some computer systems may include firmware configured to perform continuous or periodic memory diagnostics. In such cases, the firmware may detect a memory error before the memory is actually accessed by a running application or an operating system task. Further, even if not in an ejectable state when the firmware first detects a failed memory cell, the memory region having the error could become ejectable due to other operating system activity prior to being accessed. Accordingly, to reduce process or operating system terminations, method 500 may be formed to provide an indication to the operating system at the time of first detection of a memory error and for the operating system to perform a procedure to reduce exposure to operating system tasks to a failed memory cell.

As shown, the method 500 begins at step 505 where a firmware component detects an unrecoverable memory error through a diagnostic process. As stated, the firmware component may be part of a service processor configured to provide management and diagnostic functions for a computer system. In such a case, the firmware may be configured to attempt to read from successive memory addresses and report any memory addresses which cannot be successfully read. At step 510, the firmware may send a message to the operating system indicating a memory address that has failed. In a partitioned machine, the firmware may include a message to a hypervisor which in turn indicates to the operating system owning the affected memory region. At step 515, the operating system receiving the indication from firmware may be configured to determine whether the address is in a memory region (e.g., a page) that is in an ejectable state.

At step 520, if the memory region is ejectable, then at step 525, the operating system may perform (or cause to be performed) a discard procedure for the affected memory region. Further, at step 530, the operating system may restore the ejected page. For example, the ejected page may be read back in from disk to a different memory address. Of course, if step 530 is not performed, the processor will cause a "non-allocated memory access" when the memory address is eventually accessed by an instruction, resulting in the page being restored through normal means.

Otherwise, if the region is not ejectable, then at step 535, the operating system may ignore the message indicating that a memory address has failed. That is, the memory error is not handled as in an interrupt handler, because no running instruction has attempted to access the affected memory address. Further, when a process (or operating system task) does access the memory the state of the memory region might become "ejectable" by the time a process or OS encounters the memory error. At step 540, the firmware may optionally perform other actions to address an unrecoverable memory error. For example, the operating system may dynamically de-allocate the affected memory. Additionally, at step 545, the OS (or firmware) may monitor the ejectable status of the affected memory region, and upon determining that the region has transitioned to an ejectable state, perform a discard procedure for the memory region.

As described herein, embodiments of the invention provide an interrupt handler configured to distinguish between critical and non-critical unrecoverable memory errors, yielding different actions for each. Doing so may allow a system to recover from certain memory errors without having to terminate a running process. In addition, when an operating system critical task experiences an unrecoverable error, such a task may be acting on behalf of a non-critical process (e.g., when swapping out a virtual memory page). When this occurs, an interrupt handler may respond to a memory error with the same response that would result had the process itself performed the memory operation. Further, firmware may be configured to perform diagnostics to identify potential memory errors and alert the operating system before a memory region state change occurs, such that the memory error would become critical. Advantageously, by using memory region metadata, in some cases a process termination can be avoided. Additionally, some memory errors that would otherwise result in the termination of the operating system may be reduced to a mere process termination by using this information. Furthermore, with optional firmware assistance based on early memory error detection, the probability of process termination may be reduced.

While the foregoing is directed to embodiments of the present invention, other and further embodiments of the invention may be devised without departing from the basic scope thereof, and the scope thereof is determined by the claims that follow.

What is claimed is:

1. A method for improving operating system resilience to memory errors using firmware assistance, comprising:
    detecting a memory failure in a memory address allocated to an active process, prior to the occurrence of a machine check interrupt resulting from the execution of an instruction of the active process;
    sending an indication of the detected memory failure in the memory address to an instance of an operating system in which the active process is executing;
    determining, by the operating system, a memory region that includes the memory address; and
    upon determining that the memory address is in an ejectable memory region, perform a discard procedure for the memory region.

2. The method of claim 1, further comprising, deallocating the discarded memory region, wherein once deallocated, the memory region is prevented from being allocated to other processes.

3. The method of claim 1, wherein the firmware is configured to perform continuous or periodic memory diagnostics to detect the memory failure.

4. The method of claim 1, wherein the instance of the operating system is one of a plurality of operating systems running on a logically partitioned system.

5. The method of claim 4, wherein the method further comprises, notifying a hypervisor of the failed memory address, wherein the hypervisor is configured to prevent the memory region containing the memory address from being allocated to any of the plurality of operating systems.

6. The method of claim 1, wherein the ejectable memory region stores a sequence of executable instructions read in from a storage device.

7. The method of claim 1, wherein performing the discard procedure for the memory region comprises flushing the region from memory page tables mapping a page to the memory region which includes the memory address.

8. The method of claim 1, further comprising:
    upon determining that the memory address is not in an ejectable memory region, monitoring the ejectable state of the memory region; and
    upon determining that the memory region transitioned to an ejectable state, performing a discard procedure for the memory region.

9. A computer readable storage medium containing a program configured to improve operating system resilience to memory errors using firmware assistance, the operation comprising:
    detecting a memory failure in a memory address allocated to an active process, prior to the occurrence of a machine check interrupt resulting from the execution of an instruction of the active process;
    sending an indication of the detected memory failure in the memory address to an instance of an operating system in which the active process is executing;
    determining, by the operating system, a memory region that includes the memory address; and
    upon determining that the memory address is in an ejectable memory region, perform a discard procedure for the memory region.

10. The computer readable storage medium of claim 9, wherein the operation further comprise, deallocating the discarded memory region, wherein once deallocated, the memory region is prevented from being allocated to other processes.

11. The computer readable storage medium of claim 9, wherein the firmware is configured to perform continuous or periodic memory diagnostics to detect the memory failure.

12. The computer readable storage medium of claim 9, wherein the instance of the operating system is one of a plurality of operating systems running on a logically partitioned system.

13. The computer readable storage medium of claim 12, wherein the method further comprises, notifying a hypervisor of the failed memory address, wherein the hypervisor is configured to prevent the memory region containing the memory address from being allocated to any of the plurality of operating systems.

14. The computer readable storage medium of claim 9, wherein the ejectable memory region stores a sequence of executable instructions read in from a storage device.

15. The computer readable storage medium of claim 9, wherein performing the discard procedure for the memory region comprises flushing the region from memory page tables mapping a page to the memory region which includes the memory address.

16. The computer readable storage medium of claim 9, wherein the operation further comprises:
    upon determining that the memory address is not in an ejectable memory region, monitoring the ejectable state of the memory region; and
    upon determining that the memory region transitioned to an ejectable state, performing a discard procedure for the memory region.

17. A system, comprising:
    a processor; and
    a memory storing a program configured to improve operating system resilience to memory errors using firmware assistance by performing the steps of:
    detecting a memory failure in a memory address allocated to an active process, prior to the occurrence of a machine check interrupt resulting from the execution of an instruction of the active process,
    sending an indication of the detected memory failure in the memory address to an instance of an operating system in which the active process is executing,
    determining, by the operating system, a memory region that includes the memory address, and
    upon determining that the memory address is in an ejectable memory region, perform a discard procedure for the memory region.

18. The system of claim 17, wherein the steps further comprise, deallocating the discarded memory region, wherein once deallocated, the memory region is prevented from being allocated to other processes.

19. The system of claim 17, wherein the firmware is configured to perform continuous or periodic memory diagnostics to detect the memory failure.

20. The system of claim 17, wherein the instance of the operating system is one of a plurality of operating systems running on a logically partitioned system.

21. The system of claim 20, wherein the method further comprises, notifying a hypervisor of the failed memory address, wherein the hypervisor is configured to prevent the memory region containing the memory address from being allocated to any of the plurality of operating systems.

22. The system of claim 17, wherein the ejectable memory region stores a sequence of executable instructions read in from a storage device.

23. The system of claim 17, wherein performing the discard procedure for the memory region comprises flushing the region from memory page tables mapping a page to the memory region which includes the memory address.

24. The system of claim 17, wherein the steps further comprise:
upon determining that the memory address is not in an ejectable memory region, monitoring the ejectable state of the memory region; and
upon determining that the memory region transitioned to an ejectable state, performing a discard procedure for the memory region.

25. The system of claim 17, wherein the processor is a service processor configured to provide memory diagnostic functions for the memory.

* * * * *